Jan. 3, 1939.　　　　R. J. CLABEAUX　　　　2,142,436
FLAME CUTTING APPARATUS
Filed March 28, 1938　　　　3 Sheets-Sheet 1
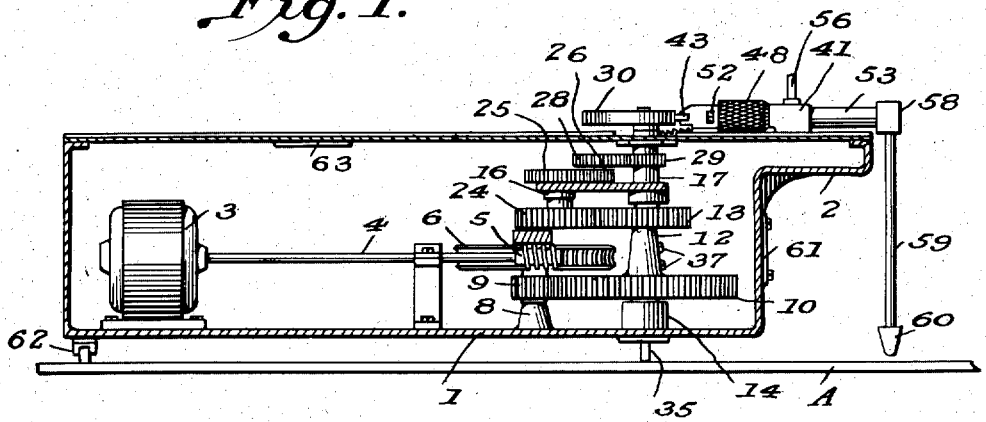

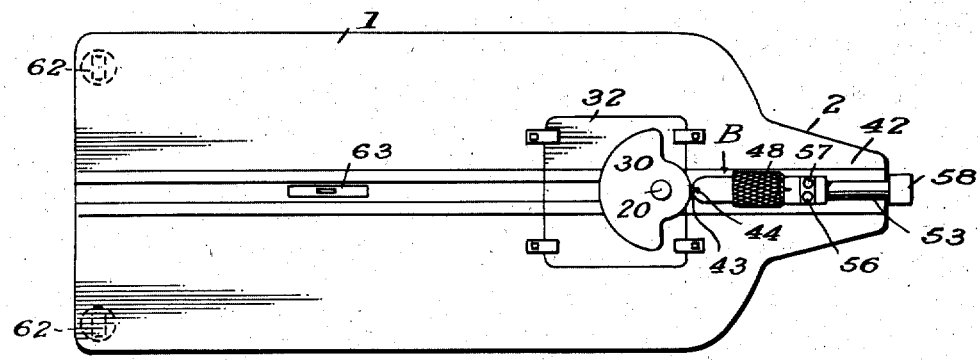
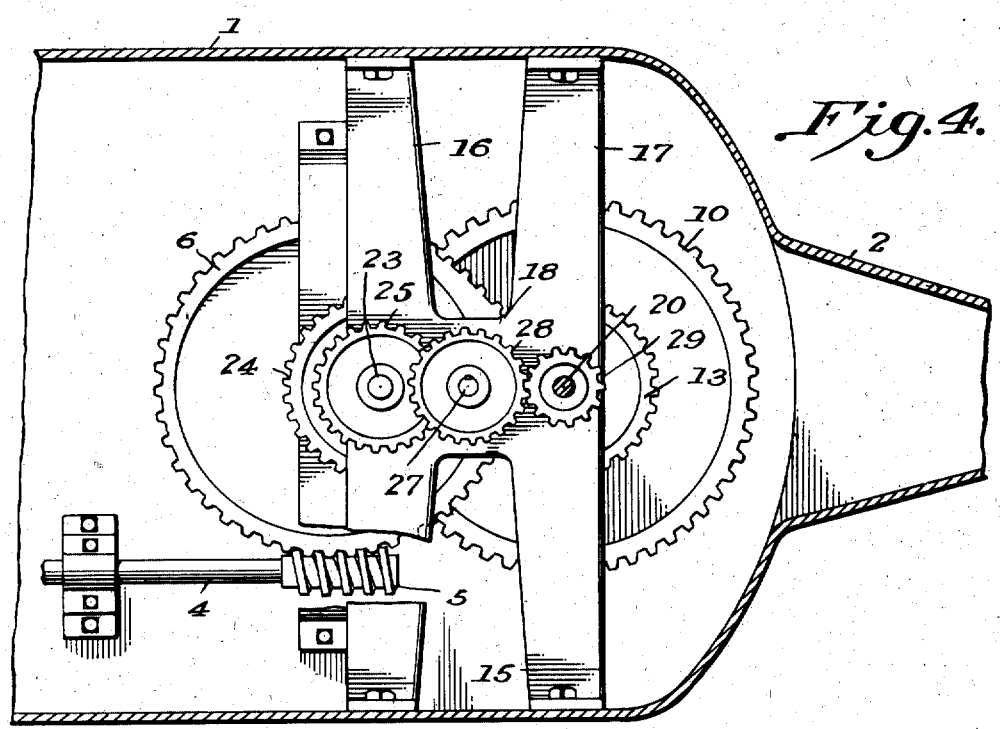

Inventor
ROBERT J. CLABEAUX

Patented Jan. 3, 1939

2,142,436

UNITED STATES PATENT OFFICE 2,142,436

FLAME CUTTING APPARATUS

Robert J. Clabeaux, Buffalo, N. Y.

Application March 28, 1938, Serial No. 198,612

10 Claims. (Cl. 266—23)

This invention relates to a machine for forming gears and other shapes having geometrical peripheries and more particularly to an apparatus that is completely automatic in operation for cutting a series of gear teeth in a blank by means of an oxyacetylene flame.

An object of the invention is to construct a unitary apparatus of portable size, which may be placed on the blank to be cut and after having been put in operation will completely cut the blank without further attention.

Another object of the invention is to provide such an apparatus with an adjustable drive and tracer mechanism so that gears of any desired contour and number of teeth may be produced.

A still further object of the invention is to provide means for adapting the machine for cutting gears having large deep teeth and to construct the cutting element with a micrometer adjustment, so as to insure that the work will be absolutely accurate.

While the invention is shown as operating with an oxyacetylene cutting flame, it will be understood by those skilled in the art that an electric cutting arc may be substituted, if the proper insulation of the apparatus is provided for.

In the drawings,

Fig. 1 is a side view of the complete apparatus shown partly in cross section with the interior of the casing exposed to illustrate the tracer cam driving means and the reducing gear train;

Fig. 2 is an enlarged view partly in cross section of the supporting pivot on which the apparatus revolves, together with the tracer cam and apparatus drive mechanism;

Fig. 3 is a top plan view of the apparatus as a whole;

Fig. 4 is an enlarged top plan of the gear train with its supporting brackets;

Fig. 9 is an enlarged view of an adjustable burner tip.

Figure 5:
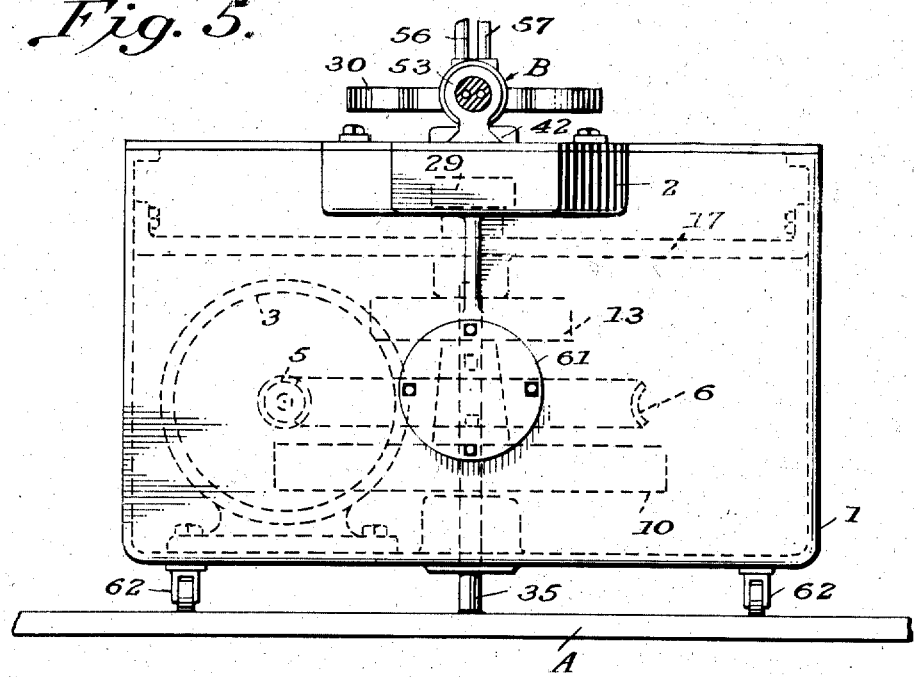
Fig. 5 is an elevation of the forward end of the machine with the drive mechanism shown in dotted lines.

Specifically the apparatus comprises a casing 1 having an offset portion 2 of reduced size extending from one end thereof. The casing may be cast or fabricated of any desired gauge sheet metal, and mounted on the floor thereof is a source of motive power such as an electric motor 3. The driving motor is preferably placed at one end of the casing to properly balance the apparatus for reasons which will hereinafter be explained.

A suitably supported horizontal drive shaft 4, having a worm 5 on the end thereof, is driven by motor 3 and meshes with a convex or other type drive pinion 6. Pinion 6 is retained on a vertical shaft 7 bearinged in an anti-friction socket 8 formed in the floor of the casing. The shaft 7 is rigidly connected with the gear 6, and, also, carries thereon a lower smaller diameter pinion 9. Pinion 9 in turn meshes with large diameter spur gear 10 having a bottom spacer or bearing 11 and an upwardly extending hub 12 carrying gear 13. The offset portion or spacer 11 is carried in a supporting cup 14 formed with or secured to the bottom of the apparatus casing.

A dual transverse brace member 15, having transverse arms 16 and 17 and connecting portion 18, is secured at its ends to opposite sides of the casing 1 for the purpose of supporting additional gears of the reducing train and driving mechanism. As seen in Figs. 2 and 4, the central portion of arm 17 is provided with a socket 19 which acts as a top support for the offset end of gear 13. Directly above the axis of the gear 13, and, also, carried by bracket 17, is a vertical rotary shaft or pivot 20. The arm 16 of bracket 15 is apertured at 21 to retain a bearing 22 which in turn supports a downwardly extending shaft 23 carrying a depending drive gear 24 which meshes with and is driven by gear 13.

A detachable gear 25 is mounted on the upper end of shaft 23 and meshes with removable pinion 26 carried on shaft 27 to which is keyed gear 28, the lower end of the shaft being mounted in bearing 33 formed in the central part of connecting section 18 of the brackets.

The upwardly extending vertical shaft 20 carries at its mid-portion a gear 29, which receives movement from gear 28 and drives detachable tracer cam 30 which is fitted over its upper end outside of the casing. The tracer cam may be keyed or otherwise detachably secured to pivot 20, and to insure that it will be held in accurate position at all times, it is preferable to form the lower side of the cam with an offset supported on a hub 31 struck up from the cover plate 32, which is removable from the top of the casing 1. This construction is desirable for the reason that drive gears 26, 28, 29 and tracer cam 30 are replaceable for producing various types of gears or other shapes, and by this construction they are readily taken out of the casing and proper substitution easily accomplished.

Referring to the drive gear 10, it will be observed from Fig. 2 that this gear, together with the entire forward end of the apparatus, is supported on a stationary vertical shaft or rod 35. The rod or pivot 35 is welded or otherwise affixed to the work blank A, and if desirable the rod may be placed in a bore hole to insure perfect vertical alignment. The stationary pivot 35 extends upwardly through opening 36 formed in the step 14 and axially through the gear 10 and associated gear 13. Set screws 37 accessible through side plate 61 are threaded in the cylindrical portion 12 between gears 10 and 13 for the purpose of binding the gears to the rod to insure that in operation the entire apparatus will be carried around the pivot in an epicyclic manner.

It is a prerequisite of the present apparatus that the upper rotary cam drive shaft 20 and the lower stationary supporting pivot rod 35 be in vertical alignment.

Figure 6:
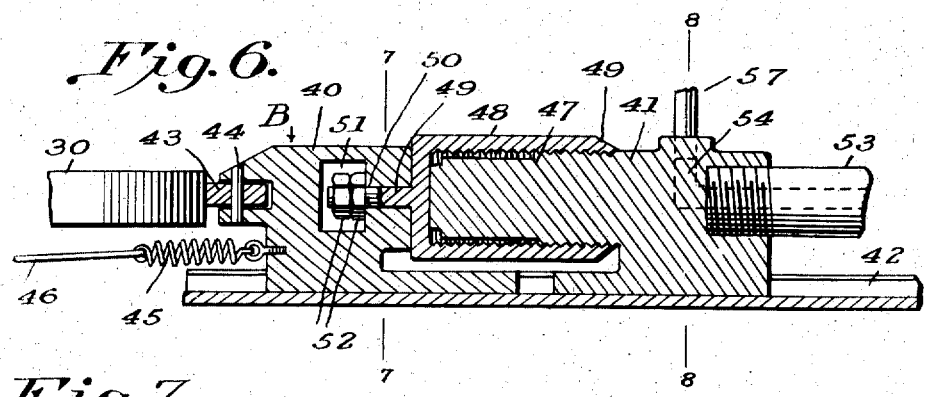
Fig. 6 is an enlarged section detail of the cutting element reciprocating mechanism, together with its micrometer adjustment.
Figure 7:
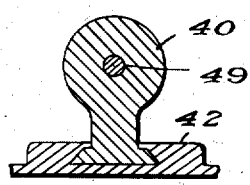
Fig. 7 is an enlarged detail in vertical section taken on line 7—7 of Fig. 6.
Figure 8:
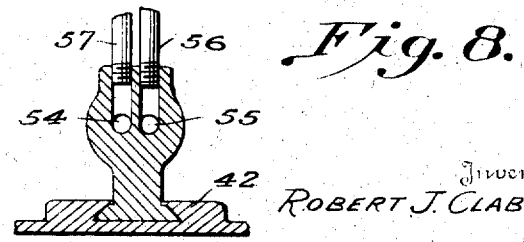
Fig. 8 is a similar view taken on line 8—8 of Fig. 6.

Mounted on the top of the casing and laterally extending beyond and supported by offset portion 2 is the gear cutting or generating device B, which is composed of several cooperating elements. As shown in detail in Fig. 6, the member B comprises telescoping blocks 40 and 41 whose bottom edges are dove-tailed and adapted for sliding movement in dove-tailed slot 42 forming across the medial line of the top of the casing. Block 40 carries an anti-friction roller 43 mounted on a vertical pin 44 in the forward end thereof, and the roller is resiliently urged into contact with the tracer cam 30 by means of tension spring 45 secured to the lower front edge of the block and tied by wire 46 around the hub 31.

The other sliding block 41 has a cylindrical portion 47, which is externally screw threaded for engagement with internally screw threaded micrometer cylinder 48. The exterior of the micrometer case is preferably knurled for easy adjustment and a graduated beveled edge is formed at the rear of the case, to cooperate with markings on the block. The micrometer case 48 is swivelled to the forward block 40 by means of pin 49 carried in axial bore 50 with the forward end of the pin extending into and terminating in aperture 51, which is cut completely through the block 40. Lock nuts 52 are secured to the screw threaded end of pin 49, so as to permit rotary movement of the pin within the bore while preventing the parts from becoming disconnected. The distance of adjustment between externally screw threaded cylinder 47 and internally screw threaded micrometer case 48 is, for instance, one inch so that between these limits a minute regulation may be secured and this is, of course, measured by the gauge figures and lines on bevelled edge 49 and the indicia carried on cylinder 41.

The rear end of block 41 is tapped for the reception of gas tube 53, which receives its supply of gases from passages 54 and 55 which are supplied from flexible gas pipes 56 and 57, which in turn are led to a suitable source of cutting gas. It will be appreciated that the gas mixing pipe 53 may be of any desired length and the pipe may be easily exchanged for pipes of different lengths when generating gear teeth of various depths and sizes. In using the apparatus for cutting large size gear teeth, the entire cutting device B may be bodily removed from the position shown in the drawings and an extension pipe 53 is substituted and the whole unit completely reversed so that it will extend across the other side of the machine and depend from the end adjacent the motor 3. Of course, the tube 53 and sliding blocks, before described, will then bear against the opposite side of the tracer cam 30.

Coupling 58 is secured to the end of gas pipe 53, and at a 90° angle to pipe 53 is threaded torch pipe 59 which terminates in a cutting torch nozzle 60 positioned slightly above the work blank A. While a fixed torch nozzle 60 may be used satisfactorily, it is preferable to form the torch with an adjustable tip, as illustrated in Fig. 9. Here, the separate gas passages 54 and 55 extending through the tip 60 are in communication with similar passages carried in individual tubes positioned in section 65 which telescopes in the ends of the gas passages in pipe 59. Adjustment of the tip is secured through rotation of toothed wheel 66 meshing with rack teeth 67 formed on the edge of a slot cut in sleeve section 65. A pin 68 is also secured to tube 59 to assist in keeping the gear teeth in mesh with the rack. It will be obvious that rotation of the knob secured to gear wheel 66 will extend or contact the tip 60 for exact adjustment of the tip in relation to the work.

In operation the center point of the blank to be cut is determined whereupon the vertical pivot 35 is welded or otherwise rigidly secured thereto and the machine is then positioned on this pivot and fastened thereto by means of said screws 37, access being had through detachable plate 61. A level 63 set in the top of the casing assists in leveling up the apparatus.

The operator then places a proper sized gear 28 in position, together with a corresponding and cooperating tracer cam 30, to insure that the cutting device B will be reciprocated for each tooth to be generated and to define the contour of the particular style of teeth being generated. The ratio attained by a proper combination of the gears 25, 26, 28 and 29 insures that the cutting torch will be reciprocated once for each tooth to be cut, while the profile of tracer cam 30 is computed to reciprocate the cutter device for the profile of the tooth and opposite halves of the roots between the teeth. Through the medium of the micrometer adjustment, the cutting torch tip may be started at precisely the point desired and after igniting the cutting-gas, power is applied to motor 3 which through the reducing gear train previously described starts to revolve the entire machine upon the stationary axle 35 and to reciprocate the cutting torch in accordance with the periphery of the tracer cam. When once started the machine is in automatic operation and it is only necessary for the operator to start and stop the machine at the proper moment. To support the apparatus during its epicyclic movement swivel rollers 62 are positioned at the end corners of the casing and proper balance and travel of the machine is thus secured.

What I claim is:

1. In a gear cutter, a cutting device adapted to move in both the profile and root of each tooth to be cut, said cutting device being carried on a pivotally mounted casing, the pivot thereof being adapted to be rigidly secured to the center of the gear blank being cut.

2. A flame gear cutting apparatus including a reducing gear train, a source of power therefor, said gear train driving a tracer cam, whose periphery defines the profile of each tooth of the gear being cut, a reciprocal torch bearing against the tracer cam and a vertical pivot adapted to be secured to the center of the gear blank being operated on, the vertical axes of the said pivot and the said tracer cam being coincident.

3. A flame gear cutting apparatus including a horizontal tracer cam whose periphery defines the profile of each tooth of the gear being cut, a power source for rotating said cam, a longitudinally reciprocal cutting torch contacting said cam, said cutting apparatus being supported on and adapted to be rotated throughout 360° on a pivot point secured to the gear blank being cut and to the apparatus directly beneath and in vertical alignment with the vertical axis of the tracer cam.

4. In a flame type metal cutting machine, a reciprocating cutting torch, a tracer cam for guiding said torch in relation to the blank being cut, a pivotal connection between the cutting machine and the gear blank, the pivot thereof being adapted to be secured to said blank and a source of power carried by said machine for rotating said tracer cam and for moving said machine as a whole around said pivotal connection.

5. In a flame type metal cutting machine, a reciprocating cutting torch, a tracer cam for guiding said torch during its movement relative to the blank being cut, a vertical pivot adapted to be affixed to the blank and on which the machine rotates, the axis thereof being in the same vertical plane as the vertical axis of the tracer cam, and a source of power carried by the machine for rotating the tracer cam and the machine as a whole upon the said vertical pivot.

6. A flame cutting apparatus including a fixed pivot adapted to be secured to the blank being cut and on which the cutting machine as a whole rotates, a tracer cam carried on the machine adapted to define the profile of the cut, a torch mounted on said machine and receiving reciprocal movement from the tracer cam, the said torch comprising a sliding block having an anti-friction end in spring pressed engagement with the periphery of said cam, the opposite end portion thereof containing fuel passages for the cutting gas and a depending flame tube secured to the end of the block.

7. A metal cutting apparatus including a casing, a vertical pivot adapted to be secured to the blank to be cut and around which said casing moves, a tracer cam carried by said casing, a cutting torch extending from said casing, one end of said torch being resiliently pressed against said cam and reciprocated thereby and a micrometer adjusting device interposed between the cam and the cutting torch.

8. A gear cutting apparatus including a power driven tracer cam, a vertical pivot on which said apparatus is supported, one end of said pivot being adapted to be attached to the gear being cut, a laterally extending and depending severing device carried on said apparatus, a roller mounted on one end of the severing device and retained in contact with said tracer cam, a cutting instrumentality mounted on the other end of said severing device and a micrometer positioned between the roller and cutting instrumentality for varying the distance therebetween.

9. A gear cutting apparatus including a casing, a motor carried therein, a vertical rotary shaft extending through the top surface of said casing, a cam affixed to the end thereof, a series of reducing gears carried interiorly of said casing, said gears receiving power from said motor and driving said shaft, a stationary pivot extending exteriorly through the bottom of said casing, said pivot being coupled to said reducing gears and in vertical alignment with the said rotary shaft, an offset cutting device slidably secured to the top of said casing and receiving reciprocating movement by contact with said cam and a gear cutting element carried by the offset cutting device.

10. A gear cutting apparatus of the character described including a casing, a stationary vertical pivot for said casing secured to the gear blank being operated upon, a rotating vertical drive shaft in alignment with the first mentioned pivot and terminating above the top plane of the casing, a source of power in said casing for rotating the casing about the pivot affixed to the gear blank, a detachable tracer cam secured to the second vertical pivot, a slot in the top plane of said casing extending from adjacent the cam to one end edge of the casing, sliding blocks adapted to reciprocate in said slot, the said blocks being arranged in telescoping arrangement, a bearing point in the leading edge of one of said blocks adapted to bear against said cam, gas passages formed in and leading to the outer edge of the other of said blocks and a cutting torch in communication with and depending from the said gas passages, the said cutting torch terminating adjacent to the blank being operated upon.

ROBERT J. CLABEAUX.

Patent No. 2,142,436                        Granted January 3, 1939

ROBERT J. CLABEAUX

The above entitled patent was extended February 26, 1952, under the provisions of the act of June 30, 1950, for 6 years and 30 days from the expiration of the original term thereof.

*Commissioner of Patents.*